(12) United States Patent
Meggiolan (10) Patent No.: US 8,002,655 B2
(45) Date of Patent: Aug. 23, 2011

(54) ACTUATOR DEVICE FOR A BICYCLE GEARSHIFT

(75) Inventor: Mario Meggiolan, Creazzo (IT)

(73) Assignee: Campagnolo, S.R.L., Vicenza (IT)

( * ) Notice: Subject to any disclaimer, the term of this patent is extended or adjusted under 35 U.S.C. 154(b) by 1383 days.

(21) Appl. No.: 11/058,042

(22) Filed: Feb. 15, 2005

(65) Prior Publication Data

US 2005/0192140 A1   Sep. 1, 2005

(30) Foreign Application Priority Data

Feb. 27, 2004  (EP) .................................. 04425126

(51) Int. Cl.
*F16H 59/00* (2006.01)

(52) U.S. Cl. ............................. 474/82; 474/83; 403/349

(58) Field of Classification Search ............... 403/109.1, 403/348–353; 474/80–83
See application file for complete search history.

(56) References Cited

U.S. PATENT DOCUMENTS

| | | | | |
|---|---|---|---|---|
| 1,033,187 A * | 7/1912 | Metzger | ........................... | 285/87 |
| 2,630,303 A * | 3/1953 | Krucker | ........................ | 366/331 |
| 2,649,300 A | 8/1953 | Launder | | |
| 3,181,383 A | 5/1965 | Hippolyte | | |
| 3,455,580 A * | 7/1969 | Howard | ........................... | 285/87 |
| 3,690,194 A | 9/1972 | Edwards | | |
| 4,131,031 A | 12/1978 | Erikson et al. | | |
| 4,241,617 A | 12/1980 | Nagano et al. | | |
| 4,459,867 A | 7/1984 | Jones | | |
| 4,838,837 A | 6/1989 | Testa | | |
| 5,048,786 A | 9/1991 | Tanaka et al. | | |
| 5,452,910 A | 9/1995 | Harris | | |
| 5,470,277 A | 11/1995 | Romano | | |
| 5,480,356 A | 1/1996 | Campagnolo | | |
| 5,482,413 A * | 1/1996 | Argaud | ........................... | 408/124 |
| 5,732,596 A | 3/1998 | Erikson et al. | | |
| 5,761,963 A | 6/1998 | Hartwig | | |
| 6,119,541 A | 9/2000 | Robinson | | |
| 6,350,212 B1 | 2/2002 | Campagnolo | | |
| 6,394,921 B1 | 5/2002 | Fukuda | | |
| 6,497,007 B2 * | 12/2002 | Newman et al. | ................. | 16/427 |
| 6,679,797 B2 | 1/2004 | Valle | | |
| 6,925,686 B2 * | 8/2005 | Heathcock et al. | ............. | 16/429 |
| 7,021,817 B2 * | 4/2006 | Huang et al. | ................... | 366/331 |
| 7,153,257 B2 * | 12/2006 | Schneider et al. | ............... | 600/25 |
| 2004/0014541 A1 * | 1/2004 | Dal Pra | ........................... | 474/70 |

(Continued)

FOREIGN PATENT DOCUMENTS

DE            035 02 774 A1     10/1986

(Continued)

*Primary Examiner* — Bradley King
*Assistant Examiner* — Thomas Irvin
(74) *Attorney, Agent, or Firm* — Volpe and Koenig, P.C.

(57) ABSTRACT

An actuator device for a bicycle gearshift is provided. The actuator device having an articulated quadrilateral mechanism intended to be integrally fixed to a bicycle frame and to a derailleur of the gearshift, a motor member that acts on the articulated quadrilateral mechanism to deform the articulated quadrilateral, and displaces the derailleur and a support element for the motor member associated with the articulated quadrilateral. According to the invention, one of the motor member and the support element comprises at least one jutting element and the other of the motor member and the support element comprises at least one seat adapted to receive said jutting element. Thus, the motor member is associated with the support element so as to prevent mutual translations in the axial direction in any operating or climatic condition.

27 Claims, 8 Drawing Sheets

U.S. PATENT DOCUMENTS

| | | |
|---|---|---|
| 2005/0192140 A1 | 9/2005 | Meggiolan |
| 2005/0266945 A1 | 12/2005 | Meggiolan |

FOREIGN PATENT DOCUMENTS

| | | |
|---|---|---|
| DE | 042 31 761 A | 3/1994 |
| DE | 42 31 761 A | 3/1994 |
| EP | 0 936 380 A1 | 8/1999 |
| EP | 1 010 612 A1 | 6/2000 |
| EP | 1 103 456 A2 | 5/2001 |
| EP | 1 357 023 A | 10/2003 |
| EP | 1 357 023 A1 | 10/2003 |
| EP | 1357023 A1 | 10/2003 |
| FR | 2 651 474 A | 3/1991 |
| JP | 07-251784 | 10/1995 |
| JP | 07251784 | 10/1995 |
| JP | 2001-200930 | 7/2001 |
| JP | 2001200930 | 7/2001 |
| JP | 2002-087371 | 3/2002 |
| JP | 2002087371 | 3/2002 |
| JP | 2003-045590 | 2/2003 |
| JP | 2003045590 | 2/2003 |
| JP | 2004-001728 | 1/2004 |
| JP | 2004001728 | 1/2004 |

* cited by examiner

ACTUATOR DEVICE FOR A BICYCLE GEARSHIFT

FIELD OF THE INVENTION

The present invention relates to an actuator device for a bicycle gearshift, that is to a mechanical device which causes the displacement of the chain between different toothed wheels, by displacing a derailleur by which the chain is guided.

BACKGROUND

Throughout the present description and the subsequent claims, the gearshift to which reference is made can either be the rear gearshift, which moves the chain between the different sprockets associated with the rear wheel of the bicycle, and the front gearshift, which moves the chain between the different crowns or chain rings associated with the pedal cranks.

Usually, the actuator device of the gearshift comprises an articulated quadrilateral mechanism intended to be integrally fixed to the bicycle frame and to the derailleur of the gearshift; the deformation of the articulated quadrilateral causes the displacement of the derailleur thereby causing a gear shift.

The aforementioned deformation of the articulated quadrilateral can be obtained manually, through the movement of control levers transmitted to the actuator through cables of the Bowden type, or else with an electric motor that—following an appropriate command imparted by the cyclist and through a suitable mechanism—displaces different parts of the articulated quadrilateral with respect to each other, deforming it and thus displacing the derailleur.

Devices of this type, and in particular actuated through an electric motor, are known in the art.

The actuator devices of the prior art, although substantially meeting the constant demands of gearshift producers to improve the precision of actuation, upon which the ease and reliability of operation of the gearshift depends, do, however, have some drawbacks still not solved.

In particular, the Applicant has noted that in the above mentioned actuator devices equipped with electric motors, the axial component of the force applied by a drive shaft to the transmission elements causes an equal and opposite axial thrust on the motor, which, if not suitably countered, tends to make it move axially with respect to the support element that houses the motor itself. This effect is emphasized in certain hot or cold environmental conditions, in which the different expansion coefficient of the materials constituting the casing of the motor and the support element further worsen the coupling between motor and support element. An undesired translation in the axial direction of the motor with respect to the support element causes a corresponding translation of the drive shaft with respect to the transmission elements, and therefore a worsening of the accuracy of actuation of the derailleur. Undesired axial translations can also be caused by accidental knocks on the gearshift.

The technical problem underlying the present invention is therefore that of providing an actuator device for a bicycle gearshift of the type described above, in which the coupling between motor and support element is such as to prevent mutual translations in the axial direction in any operating or climatic condition.

SUMMARY

According to the present invention, such a problem is solved by an actuator device for a bicycle gearshift comprising: an articulated quadrilateral mechanism intended to be integrally fixed to a bicycle frame and to a derailleur of the gearshift; a motor member acting on said articulated quadrilateral mechanism to deform the articulated quadrilateral thus determining the displacement of said derailleur; a support element for said motor member associated with the articulated quadrilateral; characterized in that one of said motor member and said support element comprises at least one jutting element or protuberance and the other of said motor member and said support element comprises at least one seat adapted to receive said at least one jutting element.

BRIEF DESCRIPTION OF THE DRAWINGS

Additional features and advantages of the present invention shall become clearer from the following description of some preferred embodiments thereof, given hereafter, for indicative and not limitative purposes, with reference to the attached drawings. In such drawings.

DETAILED DESCRIPTION OF THE PREFERRED EMBODIMENTS INTRODUCTION TO THE EMBODIMENTS

Advantageously, when the motor member is associated with the support element, the jutting element is housed in the aforementioned seat; in such a configuration, any possible translation in the axial direction of the motor member with respect to the support element is prevented. Both at rest and during operation, the motor member thus keeps the correct positioning with respect to the support element and with respect to the remaining transmission elements on which it acts, avoiding the drawbacks mentioned above with reference to the prior art. Moreover, such a result is achieved in a particularly simple manner from both the manufacturing point of view and the operative point of view. Indeed, the jutting element and the respective seat can be formed on the motor member and on the support element through conventional mechanical processing, at the time of manufacture or thereafter, and the assembly/disassembly operations of the motor member are quick and easy and do not require the use of specific tools.

Preferably, the jutting element is defined on the outer surface of the motor member and the seat is defined on the inner surface of the support element. Such an embodiment is advantageous since it requires minimal interventions on the outer surface of the motor, which is generally more fragile than the support element.

In an alternative embodiment, that is less preferred but still considered to be of interest, it is possible to define the jutting element on the inner surface of the support element and the seat on the outer surface of the motor member. The outer surface of the motor could in such a case comprise, in addition to the seat for the jutting element, appropriate recesses adapted to slidably receive the jutting element towards or away from the seat during the assembly or disassembly of the motor into and from the support element.

Preferably, the jutting element and the seat define a bayonet coupling between the motor member and the support element. Such a type of coupling advantageously combines features of simplicity, robustness and stability of coupling.

According to a second embodiment of the invention, the jutting element is mounted on the outer surface of the motor member through the interposition of an elastic element. In such a case the jutting element, whilst still being able to firmly engage with the seat when taken to it thanks to the action of the elastic element, can advantageously retract or be retracted to ease sliding of the motor member with respect to the support element during assembly and disassembly of the motor member into and from the support element.

In an alternative embodiment, it is equally possible to mount, through the interposition of an elastic element, the jutting element on the inner surface of the support element and to define the seat on the outer surface of the motor member.

In the two embodiments just described above the jutting element and the seat define a snap coupling between the motor member and the support element. In such a type of coupling, the seat preferably has a substantially closed configuration, i.e. it houses the jutting element without any possibility of mutual movement, apart from small displacements due to size tolerances. Such a type of coupling is particularly advantageous since it prevents both translations and mutual rotations between motor member and support element, thus ensuring the maintenance of the correct positioning of the motor member with respect to the support element and to the remaining transmission elements on which the motor member acts. Moreover, at a cost of a minimal complication with respect to the mentioned bayonet coupling, it can advantageously allow greater flexibility of positioning of the jutting element and of the corresponding seat, since it is not necessary to arrange, on the surface carrying the seat, possible additional recesses adapted to slidably receive the jutting element towards or away from it during assembly and disassembly of the motor member into and from the support element.

Preferably, the jutting element comprises a substantially hemispherical surface, in order to ease the sliding of the jutting element towards or away from the seat and to ease its housing in such a seat, at the same time limiting wear during such operations.

Preferably, the seat comprises a substantially cylindrical recess, which can be formed in a simple manner on the inner surface of the support element (or alternatively on the outer surface of the motor) even in a step subsequent to the manufacture, for example through milling or punching.

In an alternative embodiment, the jutting element and the seat comprise respective prismatic surfaces, in order to increase the stability of the coupling between jutting element and seat.

Preferably, the jutting element is made from metallic material; such a material is particularly suitable due to its characteristics of resistance to stress and wear.

Preferably, the support element comprises at least one elastically yielding free end portion provided with a pair of facing eyelets adapted, to receive clamping means of said support element of the motor member around said motor member. This provides a further fastening system between motor member and support element, in particular advantageous for preventing rotations of the motor member with respect to the support element in the specific case where the seat does not have a substantially closed configuration.

The clamping means of the two eyelets are preferably of the conventional type, for example a bolt. The support element can be pivotally associated with the articulated quadrilateral or integrally formed with the articulated quadrilateral.

In a first preferred embodiment of the actuator device of the present invention, the articulated quadrilateral mechanism comprises four connecting rods hinged together along four pin axes by four pin elements, where a first connecting rod is adapted to be integrally fixed to the bicycle frame and a second connecting rod, opposite to the first connecting rod in the articulated quadrilateral, is adapted to support the derailleur of the gearshift, wherein the motor member acts between two opposite pin elements of the articulated quadrilateral along a drive axis that substantially intersects the pin axis of both of the aforementioned two pin elements and the support element is associated with the second of said two opposite pin elements.

Throughout the present description and the subsequent claims, the term "connecting rod" is generically used to indicate a rigid element suitable for transmitting the motion to other elements to which it is pivotally connected.

This embodiment of the articulated quadrilateral mechanism is particularly effective since the deformation action takes place substantially along one of the diagonals of the articulated quadrilateral; this ensures the best conditions for controlling the deformation itself and thus for controlling the movement of the second connecting rod with the derailleur.

In a second preferred embodiment of the actuator device of the present invention, the motor member acts between said first connecting rod of the articulated quadrilateral and an adjacent connecting rod through the operative interposition of an actuation arm integrally associated with said adjacent connecting rod and preferably the support element of the motor member is integrally formed with the first connecting rod.

Preferably, the support element comprises, at said at least one first free end portion, a first slit arranged between the aforementioned two facing eyelets and extending longitudinally starting from a free end of said support element, wherein the seat is defined at one end of said first slit opposite to said free end of the support element.

Even more preferably, the support element comprises a second substantially transversal slit intersecting said first slit at the aforementioned end of the first slit opposite to said free end of said support element, wherein the seat is formed at the intersection of said first and second slits.

Preferably, in such a second embodiment of the actuator device of the present invention, the seat has a substantially closed configuration, where with the expression "substantially closed" it is meant that the seat is perimetrically closed, apart from small openings defined at the aforementioned slits, so as to house the jutting element in a way that prevents both translations and mutual rotations between motor member and support element.

DESCRIPTION OF THE EMBODIMENTS

In such figures an actuator device for a bicycle gearshift in accordance with the present invention is generally indicated at 1. In all of the figures, structurally or functionally equivalent elements are indicated with the same reference numerals. Both the gearshift and the bicycle are not illustrated.

The actuator device 1 comprises an articulated quadrilateral mechanism 10, including four connecting rods: a first connecting rod 101 adapted to be integrally fixed to the bicycle frame, a second connecting rod 102 opposite to the first connecting rod 101 in the articulated quadrilateral 10 and adapted to be fixed to a support for the derailleur of the gearshift, a third connecting rod 103 and a fourth connecting rod 104. The connecting rods 101, 102, 103 and 104 are articulated with each other along four pin axes 111, 112, 113 and 114 by four respective pin elements 121, 122, 123 and 124, so as to form the articulated quadrilateral 10. In particular, each of the pin elements 121 and 122 is defined by a single pin extending along the respective pin axis 111 and 112, whereas each of the pin elements 123 and 124 is defined by a respective pair of opposite pins aligned along the respective pin axis 113 and 114.

Figure 1:
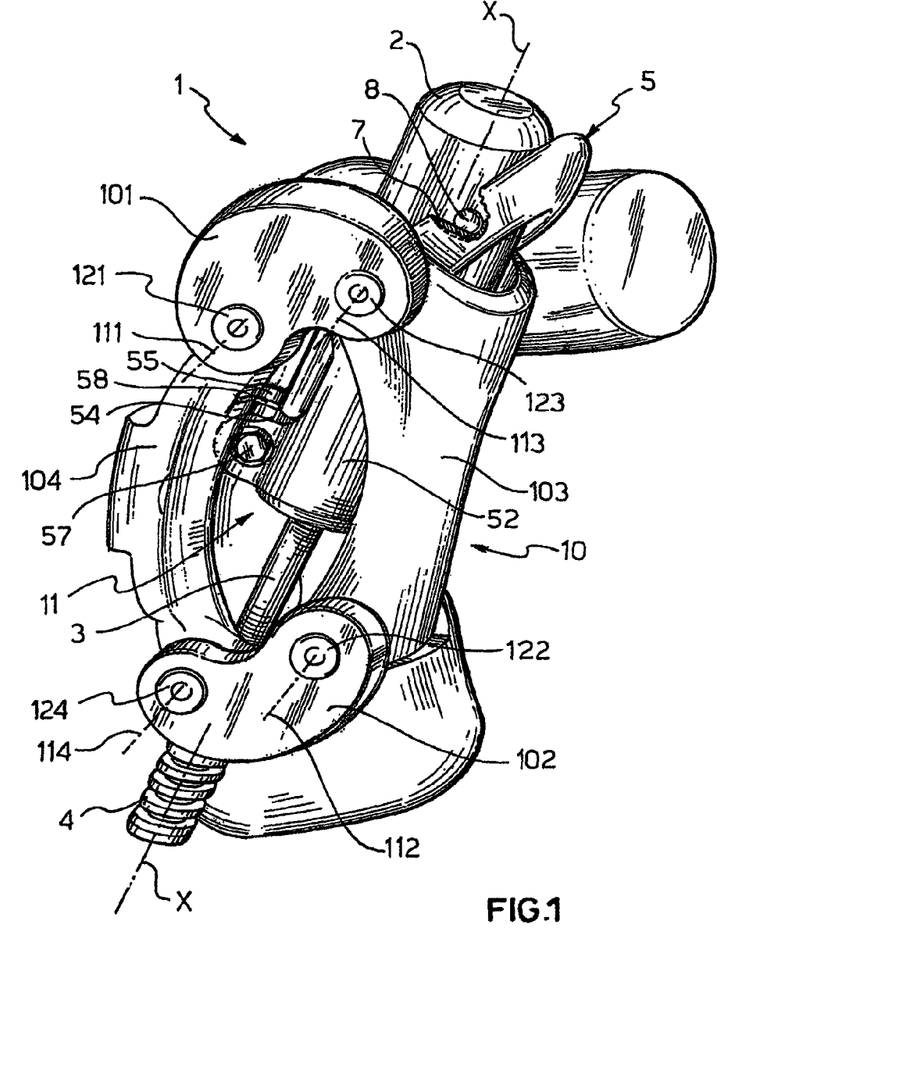
FIG. 1 is a perspective view with partially removed parts of an actuator device for a bicycle gearshift according to a first preferred embodiment of the invention.
Figure 2:
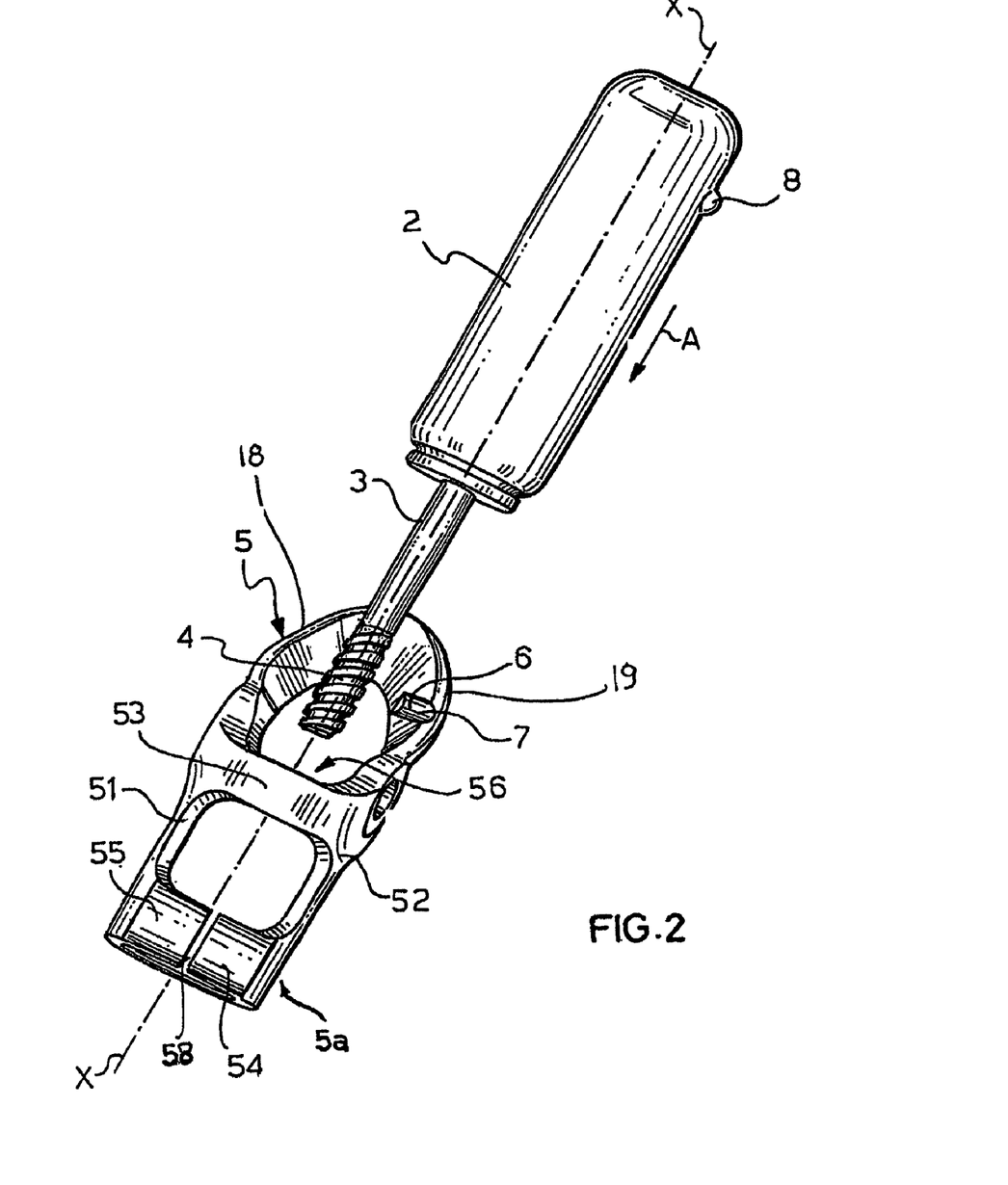
FIG. 2 is an exploded perspective view of two details of the actuator device of FIG. 1.
Figure 2A:
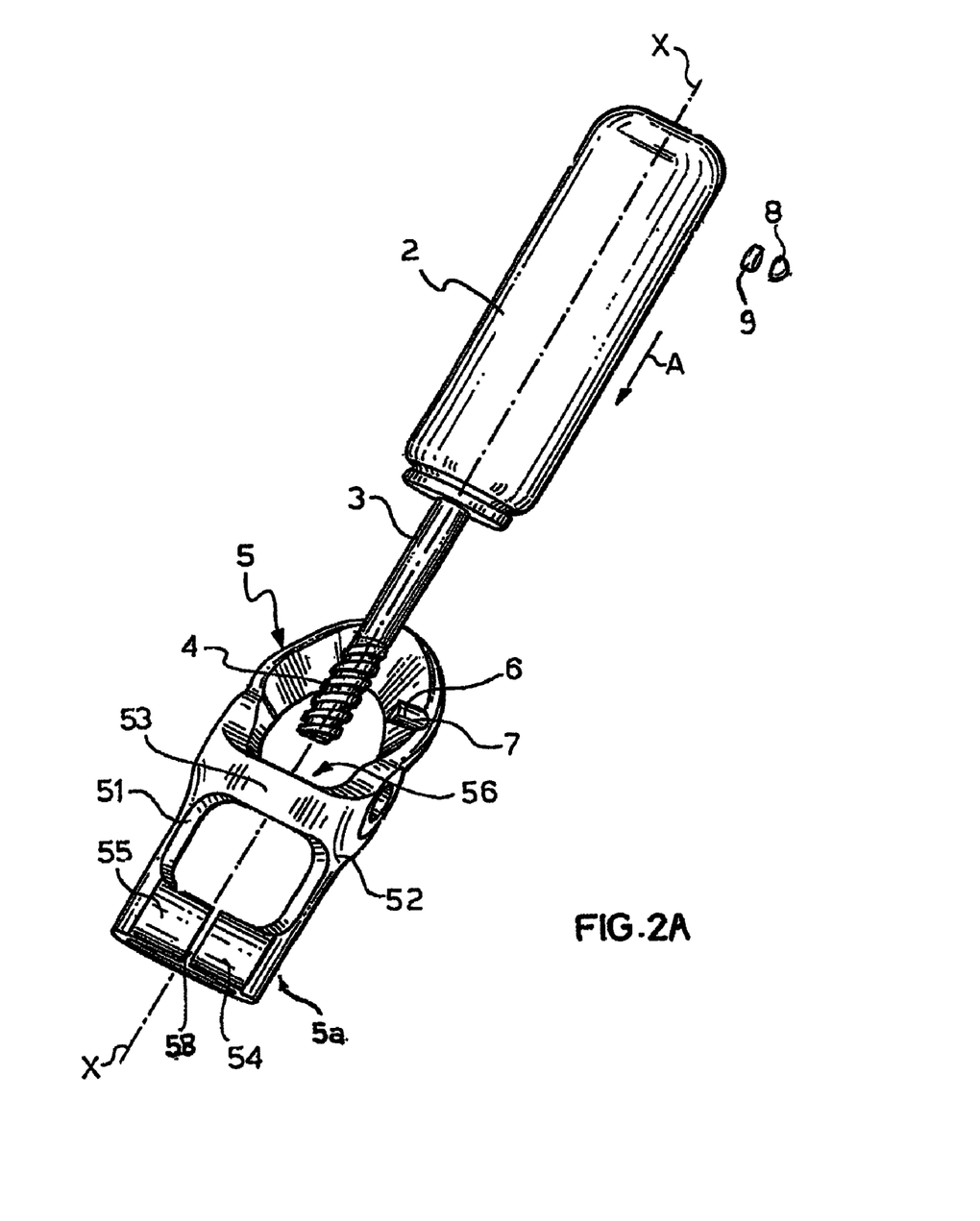
FIG. 2A is an exploded perspective view of an actuator device having a jutting element mounted on the outer surface of the motor element through the interposition of an elastic element.
Figure 2B:
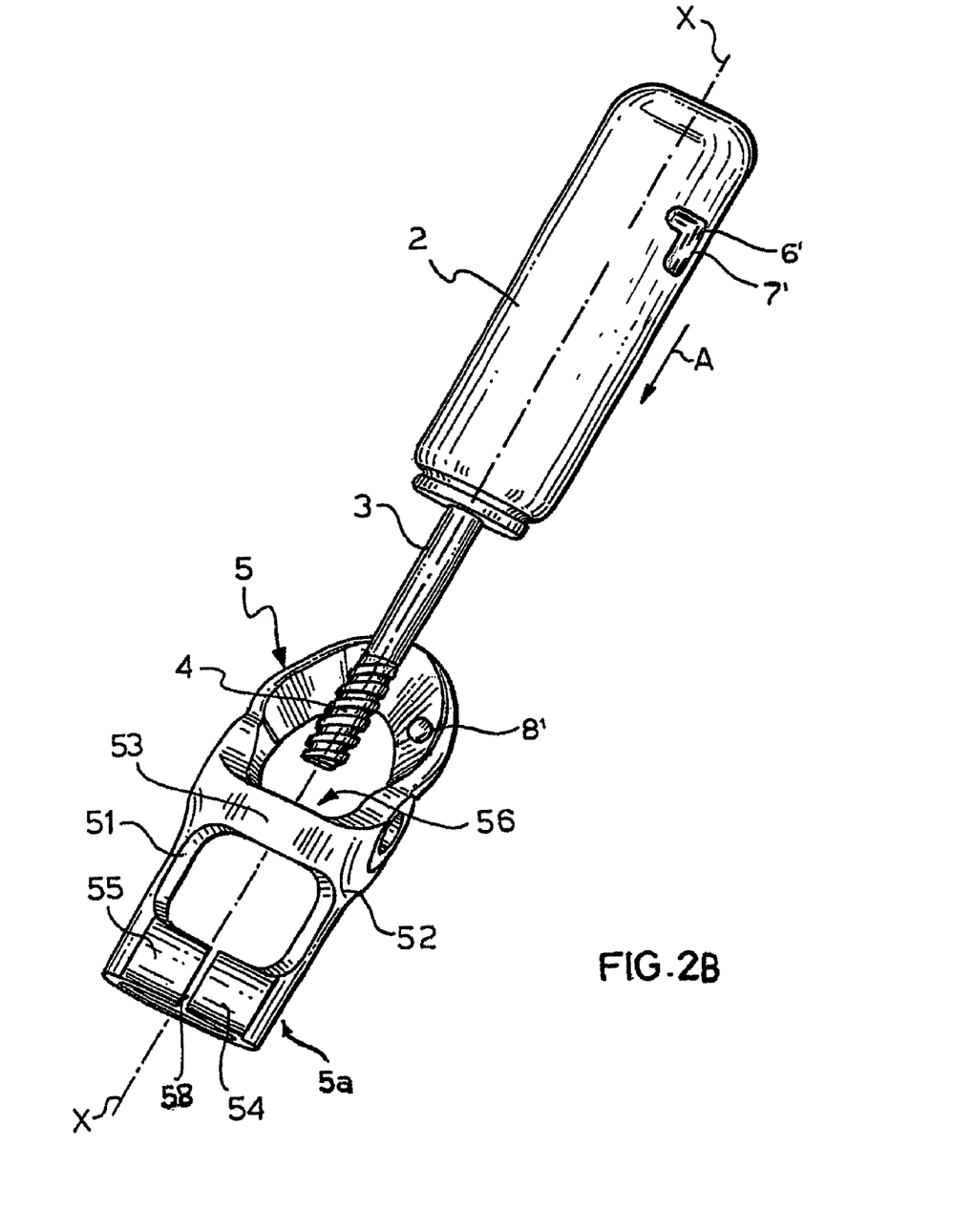
FIG. 2B is an exploded perspective view of an actuator device having a jutting element defined on an inner surface of the support element and a seat defined on an outer surface of the motor.
Figure 3:
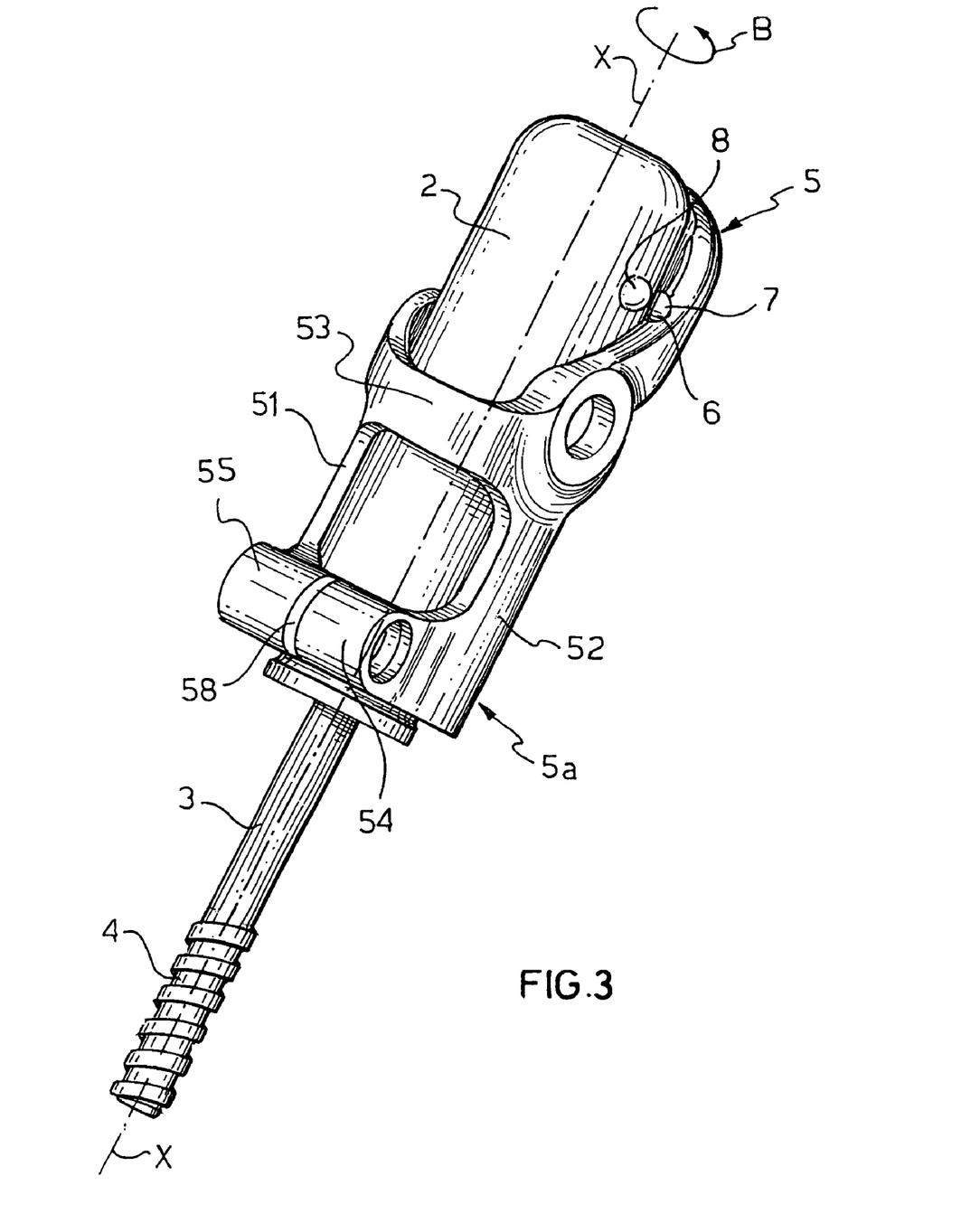
FIG. 3 is a perspective view of the details of FIG. 2 in an assembled configuration.

With reference to the embodiment illustrated in FIGS. 1-3, the specific configuration of the articulated quadrilateral 10 and of the constitutive elements has already been described and illustrated in detail in U.S. Patent Publication No. U.S. 2004014541, assigned to the same Assignee of the present invention, which is incorporated herein by reference. Such an embodiment is particularly suitable for use in a rear gearshift.

In such an embodiment, the actuator device 1 comprises a motor member 2, typically an electric motor, which is associated with the pin element 123 and acts between the pin element 123 and the opposite pin element 124 along a drive axis X-X; such an axis substantially intersects the pin axes 113 and 114, or rather substantially coincides with the diagonal of the articulated quadrilateral 10 passing through the aforementioned pin axes 113 and 114.

The motor member 2 is provided with a drive shaft 3. At the free end of the drive shaft 3 a screw 4 is integrally formed. This screw is adapted to engage a nut screw (not shown in the figures but disclosed in Applicant's pending U.S. patent application Ser. No. 10/911,195 which is incorporated herein by reference) integral with the pin element 124. The rotation of the drive shaft 3, and therefore of the screw 4, causes the sliding of the nut screw on the screw 4 and, consequently, a variation in the distance, measured along the drive axis X-X, between the motor member 2 fixed to the pin element 123 and the nut screw fixed to the opposite pin element 124. Such a variation in turn causes a corresponding deformation of the articulated quadrilateral 10 and, therefore, the displacement of the derailleur associated with it.

The motor member 2 is structurally associated with the pin element 123 by means of a support element 5, which is integrally associated with the first pin element 123. The support element 5 and the motor member 2 are also preferably arranged in a space 11 inside the articulated quadrilateral 10, in order to minimize the overall size of the actuator device 1.

As shown more precisely in FIGS. 2 and 3, the support element 5 is formed by an open-cradle monolithic structure, preferably made of plastic material, with two side walls 51 and 52 connected by a bridge 53 and having an elastically yielding free end portion 5a. At such a free end portion 5a of the support element 5, the two side walls 51 and 52 are provided with respective facing eyelets 54 and 55 that are aligned so as to be able to receive conventional clamping means, like for example a bolt 57 (FIG. 1). Between the walls 51, 52 a receiving space 56 is defined for the motor member 2. The side walls 51, 52 extend diagonally with respect to the drive axis X-X of the motor, and include diagonally extending edges 18, 19.

Between the two eyelets 54, 55 a space 58 is defined that ensures the possibility of carrying out a clamping of the support element 5 around the motor member 2.

According to the invention, a jutting element or protuberance 8 is defined on the outer surface of the motor member 2 and at an end thereof; a corresponding seat 6, adapted to receive the jutting element 8, is defined on the inner surface of the support element 5. The jutting element 8 comprises a preferably metallic substantially hemispherical surface and preferably is integrally formed on the outer surface of the motor member 2; alternatively, it can be fixed onto said surface mechanically or through welding or other conventional mechanical processes.

The seat 6 extends along a linear direction, which is perpendicular to the drive axis X-X of the motor member 2, and comprises a substantially cylindrical recess 7, with substantially the same diameter as that of the hemispherical surface of the jutting element 8, so as to avoid undesired clearances. The recess 7 extends on the inner surface of the support element 5 along a direction substantially perpendicular to the drive axis X-X and up to an edge 19 of the side wall 52 so as to be able to engage/disengage the jutting element 8 with respect to the seat 6.

In the embodiment shown in FIGS. 1, 2 and 3 the jutting element 8 and the seat 6 define a bayonet coupling between the motor member 2 and the support element 5. To carry out assembly, the motor member 2 is at first axially introduced into the receiving space 56 as indicated by the arrow A of FIG. 2; when the jutting element 8 is at the recess 7 the motor member 2 is rotated according to the arrow B of FIG. 3 until the jutting element 8 engages completely with the seat 6. In this condition, shown in FIG. 1, axial displacements of the motor member 2 with respect to the support element 5 are substantially prevented; possible rotations, on the other hand, are substantially prevented by the clamping around the motor member 2 of the eyelets 54 and 55 through conventional clamping means, like for example bolts 57.

Alternatively, the jutting element 8' can be defined on the inner surface of the support element 5, whereas the seat 6' is defined on the outer surface of the motor member 2, as shown in FIG. 2B. In this case, the seat 6' comprises a recess 7', and can be configured in such a way as to define a substantially L-shaped path for the jutting element 8', with a first portion substantially parallel to the drive axis X-X, adapted to slidably receive the jutting element 8' when the motor member 2 is introduced into the receiving space 56 of the support element 5, and a second portion substantially transversal with respect to the axis X-X, adapted to house the jutting element 8' and axially lock, through rotation about the axis X-X, the motor member 2 in the support element 5.

The jutting element 8 can also be mounted on the outer surface of the motor element 2 or on the inner surface of the support element 5 through the interposition of an elastic element 9, as shown in FIG. 2A. In such a way the jutting element 8 and the seat 6 allow a snap coupling to be realized between the motor element 2 and the support element 5.

Figure 4:
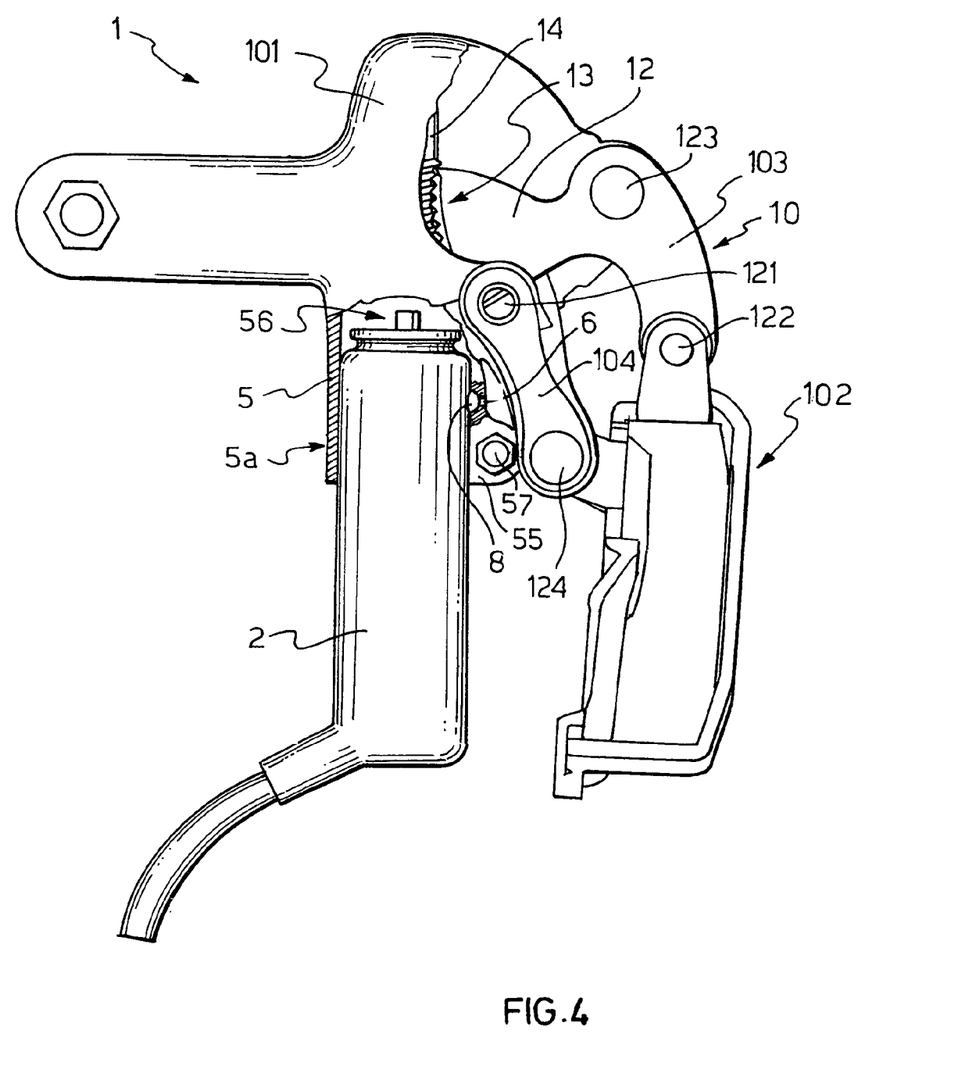
FIG. 4 is a perspective view with partially removed parts of an actuator device for a bicycle gearshift according to a second preferred embodiment of the invention.
Figure 5:
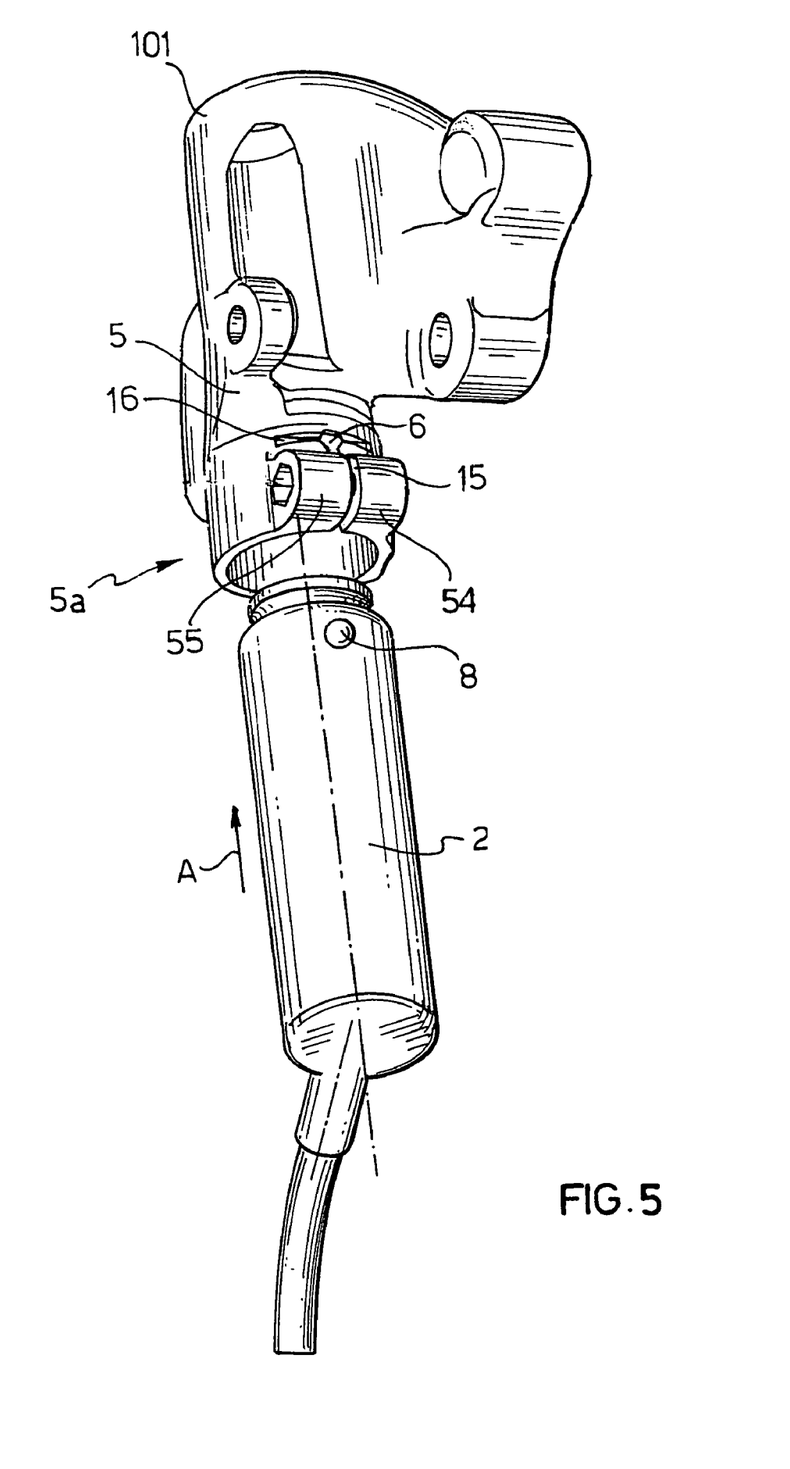
FIG. 5 is an exploded perspective view of two details of the actuator device of FIG. 4.
Figure 6:
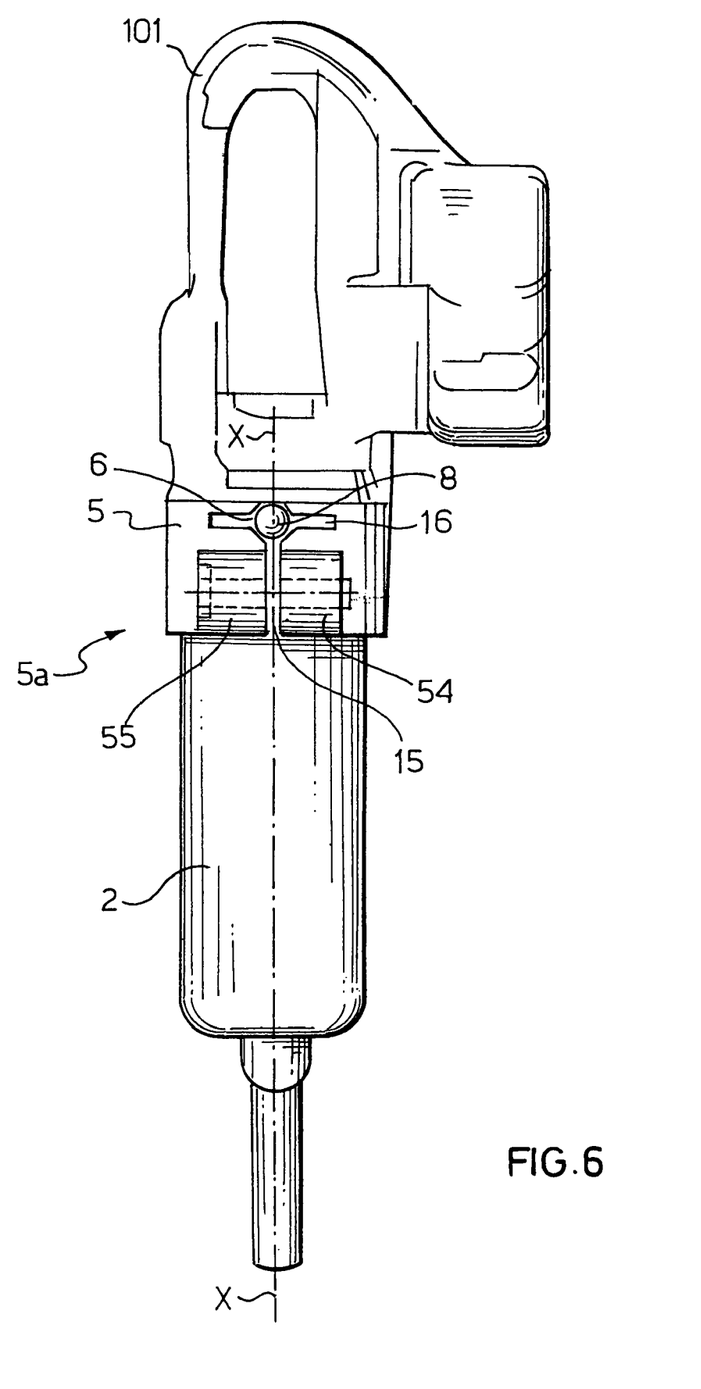
FIG. 6 is a perspective view of the details of FIG. 5 in an assembled configuration.

FIGS. 4, 5 and 6 show a further embodiment of an actuator device according to the invention, particularly suitable for a derailleur for a front gearshift. Also in this case, the actuator device 1 comprises an articulated quadrilateral mechanism 10 including the four connecting rods 101, 102, 103 and 104, connected together through the four pin elements 121, 122, 123 and 124. The connecting rod 101 is adapted to be integrally fixed to the bicycle frame, whereas the connecting rod 102 substantially coincides structurally with the derailleur. Also in this case, each of the pin elements 121 and 122 is defined by a single pin extending along the respective pin axis 111 and 112, whereas each of the pin elements 123 and 124 is defined by a respective pair of opposite pins aligned along the respective pin axis 113 and 114.

The actuator device 1 further comprises a motor member 2, typically an electric motor, which is structurally associated with the connecting rod 101 and acts between the connecting rod 101 and the adjacent connecting rod 103 through the interposition of an actuation arm 12 integrally formed with the connecting rod 103. The motor member 2 moves in rotation a worm screw 14, which engages a toothed sector 13 formed on the actuation arm 12 (FIG. 4). The consequent movement of the connecting rod 103 around the pin element 123 determines a deformation of the articulated quadrilateral 10 and the displacement of the derailleur.

The specific configuration of the articulated quadrilateral 10 and of the constitutive elements, as well as the different embodiments of the gear transmission between the connecting rod 101 and the adjacent connecting rod 103, have already been illustrated in detail in U.S. Pat. No. 6,679,797 to the same Assignee of the present invention and is incorporated herein by reference.

The motor member 2 is structurally associated with the connecting rod 101 by means of a support element 5 integrally formed at an end of the connecting rod 101.

As shown more precisely in FIGS. 5 and 6, the support element 5 comprises a substantially cylindrical receiving space 56 for the motor member 2. At an elastically yielding free end portion 5a of the support element 5 eyelets 54 and 55 are defined facing each other and aligned so as to be able to receive conventional clamping means, like for example a bolt 57 (FIG. 4). The support element 5 further comprises a first slit 15 that extends longitudinally starting from a free end of the support element 5 and a second slit 16, that is substantially transversal to and intersects the first slit 15 at an end thereof opposite to the aforementioned free end of the support element 5. The first slit 15 longitudinally separates the eyelets 54 and 55 and ensures the possibility of carrying out a clamping of the eyelets 54 and 55 around the motor member 2 to prevent possible rotations between motor member 2 and support element 5.

Also in this embodiment, a jutting element 8 is defined on the outer surface of the motor member 2 and at an end thereof. The jutting element comprises a preferably metallic and substantially hemispherical surface, preferably formed integrally on the outer surface of the motor member 2. Alternatively, the jutting element 8 can be fixed on said surface mechanically or through welding. The support element 5 comprises a corresponding seat 6 formed at the intersection of the longitudinal slit 15 and the transversal slit 16.

For assembly the motor member 2 is at first axially introduced in the receiving space 56 as indicated by the arrow A of FIG. 5 making the jutting element 8 slide in the longitudinal slit 15 until it is at the seat 6 (FIG. 6). The entry and the sliding of the jutting element 8 in the longitudinal slit 15 is obtained thanks to the elastic yield of the end portion 5a of the support element 5. Thereafter the eyelets 54 and 55 are clamped through the bolt 57 so as to ensure the simultaneous clamping around the motor member 2 and the keeping of the jutting element 8 inside the seat 6. In this condition, shown in FIG. 4, both axial displacements and rotations of the motor member 2 with respect to the support element 5 are substantially prevented.

Advantageously, when the motor member is associated with the support element, the jutting element is housed in the aforementioned seat; in such a configuration, any possible translation in the axial direction of the motor member with respect to the support element is prevented. Both at rest and during operation, the motor member thus keeps the correct positioning with respect to the support element and with respect to the remaining transmission elements on which it acts, avoiding the drawbacks mentioned above with reference to the prior art. Moreover, such a result is achieved in a particularly simple manner both from the manufacturing point of view and the operative point of view. Indeed, the jutting element and the respective seat can be formed on the motor member and on the support element through conventional mechanical processing, at the time of manufacture or thereafter, and the assembly/disassembly operations of the motor member are quick and easy and do not require the use of specific tools.

Preferably, the jutting element is defined on the outer surface of the motor member and the seat is defined on the inner surface of the support element. Such an embodiment is advantageous since it requires minimal interventions on the outer surface of the motor, which is generally more fragile than to the support element.

Obviously, one skilled in the art may introduce modifications and variants to the preferred embodiments of the invention described above in order to satisfy specific and contingent operational requirements, said modifications and variants in any case falling within the scope of protection as defined by the subsequent claims. For example, the jutting element 8 and the seat 6 may comprise respective prismatic surfaces, for example quadrangular, in order to increase the stability of the coupling between jutting element and seat.

What is claimed is:

1. Actuator device for a bicycle gearshift, comprising:
an articulated quadrilateral mechanism intended to be integrally fixed to a bicycle frame and to a derailleur of the gearshift;
a motor member extending along a drive axis and having a drive shaft acting on said articulated quadrilateral mechanism to deform the articulated quadrilateral thus determining the displacement of said derailleur, and at least one jutting element;
a support element, for said motor member associated with the articulated quadrilateral, that includes at least one seat defined by a single slot that is perpendicular to the drive axis along an entire length of said slot and terminates at a peripheral edge of a side wall of said support element and is adapted to receive said at least one jutting element, said side wall of said support element being substantially parallel to said drive axis; and
engagement between the at least one jutting element and the seat prevents displacement of the motor member with respect to the support.

2. Device according to claim 1, wherein said at least one jutting element is defined on the outer surface of said motor member and said at least one seat is defined on the inner surface of said support element.

3. Device according to claim 1, wherein said at least one jutting element and said at least one seat define a bayonet coupling between said motor member and said support element.

4. Device according to claim 1, wherein said at least one jutting element is mounted through the interposition of an elastic element.

5. Device according to claim 4, wherein said at least one jutting element and said at least one seat define a snap coupling between said motor member and said support element.

6. Device according to claim 1, wherein said at least one jutting element comprises a substantially hemispherical surface.

7. Device according to claim 1, wherein said slot comprises a substantially cylindrical recess.

8. Device according to claim 1, wherein said at least one jutting element and said slot comprise respective prismatic surfaces.

9. Device according to claim 1, wherein said at least one jutting element is made of metallic material.

10. Device according to claim 1, wherein said support element comprises at least one elastically yielding free end portion provided with a pair of facing eyelets adapted to receive clamping means of said support element around said motor member.

11. Device according to claim 1, wherein said support element is pivotally associated with said articulated quadrilateral.

12. Device according to claim 11, wherein said articulated quadrilateral mechanism comprises four connecting rods hinged together along four pin axes by four pin elements, where a first connecting rod is adapted to be integrally fixed to the bicycle frame and a second connecting rod, opposite to the first connecting rod in the articulated quadrilateral, is adapted to support the derailleur of the gearshift, and wherein said motor member acts between two opposite pin elements of the articulated quadrilateral along a drive axis that substantially intersects the pin axis of both of said two opposite pin elements and said support element is associated with the second of said two opposite pin elements.

13. Device according to claim 1, wherein said support element is integrally formed with said articulated quadrilateral.

14. Device according to claim 13, wherein said articulated quadrilateral mechanism comprises four connecting rods hinged together along four pin axes by four pin elements, where a first connecting rod is adapted to be integrally fixed to the bicycle frame and a second connecting rod, opposite to the first connecting rod in the articulated quadrilateral, is adapted to support the derailleur of the gearshift, and wherein said motor member acts between said first connecting rod of the articulated quadrilateral and an adjacent connecting rod through the operative interposition of an actuation arm integrally associated with said adjacent connecting rod and said support element is integrally formed with said first connecting rod.

15. Device according to claim 1, wherein said slot has a substantially closed configuration.

16. A motorized actuator for a bicycle gearshift comprising:
an articulating mechanism having a first portion connected to a bicycle frame and a second portion connected to a derailleur;
a support mechanically coupled to the articulating mechanism, the support comprising first and second side walls that define a receiving space; and
a motor seated within the receiving space of the support, the motor having a shaft rotatable about an axis and that is operatively connected to the articulating mechanism,
wherein the support comprises a clamping element that prevents rotation of the motor with respect to the support, and the motor and an inner surface of one of the side walls each comprises a retaining element, the retaining element of the motor being a protuberance and the retaining element of the inner surface of one of the side walls defined by a single slot perpendicular to the axis of the shaft of the motor along an entire length of the slot and terminating at a peripheral edge of the one of the side walls, the one of the side walls being substantially parallel to the axis of the shaft of the motor, the retaining elements being matingly engagable and preventing axial translation of the motor when seated within the support, such that the clamping element and the retaining elements maintain the motor in a fixed position with respect to the support.

17. The actuator of claim 16, wherein the protuberance has a shape that is either hemispherical, prismatic or quadrangular.

18. The actuator of claim 16, wherein said shaft comprises a free end having a threaded portion, said threaded portion engagable with a portion of the articulating mechanism and causes the engaged portion of the mechanism to travel along the threaded portion when the shaft rotates resulting in a deformation of the articulating mechanism and displacement of the derailleur.

19. The actuator of claim 16, wherein said articulating mechanism comprises at least four connecting rods hingedly connected about at least four pin axes by at least four pin elements wherein a first connecting rod is fixable to a bicycle frame and a second connecting rod, opposite the first connecting rod is fixable to the derailleur of the gearshift and wherein said motor acts between a third pin element and a fourth pin element along an axis that substantially intersects a third axis and a fourth pin axis, and said support is associated with said third pin element.

20. The actuator of claim 16, wherein the retaining elements define a bayonet coupling between said motor and said support.

21. The actuator of claim 16, wherein said protuberance is mounted through the interposition of an elastic element.

22. The actuator of claim 16, wherein said articulating mechanism comprises four connecting rods hinged together along four pin axes by four pin elements, where a first connecting rod is fixable to a bicycle frame and a second connecting rod, opposite to the first connecting rod in the articulating mechanism, is fixable to the derailleur of the gearshift, and wherein said motor acts between said first connecting rod of the articulating mechanism and an adjacent connecting rod through the operative interposition of an actuation arm integrally associated with said adjacent connecting rod and said support element is integrally formed with said first connecting rod.

23. An actuator for a bicycle gearshift comprising:
an articulating quadrilateral, having a first portion fixable to a bicycle frame and a second portion fixable to a bicycle derailleur, said quadrilateral deformable to displace said derailleur to effect a gear change;
a support mechanically coupled to said quadrilateral and including side walls having inner surfaces defining at least one seat having a recess; and
a motor supported by the support connected to the quadrilateral via a shaft that rotates about an axis and operatively connected to a power supply, said motor further comprises at least one stop having a protuberance disposed on an outer surface thereof matingly engagable with said at least one seat to prevent axial translation of the motor with respect to the support, said at least one seat being defined by a single slot perpendicular to a drive axis of the motor along an entire length of the slot and terminating at a peripheral edge of one of the side walls, the one of the side walls being substantially parallel to the drive axis.

24. An actuator for a bicycle gearshift comprising:
an articulating quadrilateral, having a first portion fixable to a bicycle frame and a second portion fixable to a bicycle derailleur, said quadrilateral deformable to displace said derailleur to effect a gear change;

a support mechanically coupled to said quadrilateral and including side walls having inner surfaces defining at least one seat having a recess; and a motor supported by the support connected to the quadrilateral via a shaft that rotates about an axis and operatively connected to a power supply, said motor further comprises at least one stop having at least one protuberance disposed on an outer surface thereof;

the recess being defined by a single slot that has a longitudinal extension perpendicular to a drive axis of the motor along an entire length of the slot and extending to an edge of one of the side walls, the one of the side walls being substantially parallel to the drive axis, the recess being matingly engagable with said at least one protuberance to prevent axial translation of the motor with respect to the support.

25. An actuator for a bicycle gearshift comprising:

an articulating quadrilateral, having a first portion fixable to a bicycle frame and a second portion fixable to a bicycle derailleur, said quadrilateral deformable to displace said derailleur to effect a gear change;

a support mechanically coupled to said quadrilateral and including a clamping element and first and second side walls, one of the side walls defining a single slot having a longitudinal extension; and a motor supported by the support connected to the quadrilateral via a shaft that rotates about an axis and operatively connected to a power supply, said motor further comprises at least one stop having a protuberance disposed on an outer surface thereof matingly engagable with said slot to prevent axial translation of the motor with respect to the support;

said slot extends along a linear direction, which is perpendicular to a drive axis of said motor, and said longitudinal extension of said slot is perpendicular to the drive axis along an entire length of the slot and terminates at a peripheral edge of the one of the sidewalls, the one of the sidewalls being substantially parallel to the drive axis;

said shaft comprises a free end having a threaded portion, said threaded portion engagable with a portion of the articulating quadrilateral and causes the engaged portion of the quadrilateral to travel along the threaded portion when the shaft rotates resulting in a deformation of the articulating quadrilateral and displacement of the derailleur; and the clamping element prevents rotation of the motor with respect to the support and engagement of the protuberance and the at least one seat prevent axial movement of the motor with respect to the support, such that the clamping element, the protuberance and the seat together maintain the motor in a fixed position with respect to the support.

26. An actuator for a bicycle gearshift comprising:

an articulating quadrilateral, having a first portion fixable to a bicycle frame and a second portion fixable to a bicycle derailleur, said quadrilateral deformable to displace said derailleur to effect a gear change;

a support mechanically coupled to said quadrilateral and including side walls that define a motor receiving space, a selected side wall having an inner surface defining at least one seat having a recess; and a motor supported by the support connected to the quadrilateral via a shaft that rotates about an axis and operatively connected to a power supply, said motor further comprises at least one stop having a protuberance disposed on an outer surface thereof matingly engagable with said at least one seat to prevent axial translation of the motor with respect to the support, said articulating quadrilateral comprises at least four connecting rods hingedly connected about at least four pin axes by at least four pin elements wherein a first connecting rod is fixable to a bicycle frame and a second connecting rod, opposite the first connecting rod is fixable to the derailleur of the gearshift and wherein said motor acts between a third pin element and a fourth pin element along an axis that substantially intersects a third axis and a fourth pin axis, and said support is associated with said third pin element, and said seat is defined by a single slot that has a longitudinal extension in a direction perpendicular to a drive axis of the motor along an entire length of the slot and terminates at a peripheral edge of the selected side wall, the selected side wall being substantially parallel to the drive axis.

27. An assembly for securing a motor of a motor driven bicycle gear shifter, the assembly comprising:

a motor support having a motor receiving cradle that includes at a first end a clamping element that fixes a motor positioned in the cradle against rotation within the cradle and at a second end a single slot that complements a defined portion of the motor positioned within the cradle; and the motor being dimensioned to fit within the cradle of the motor support and including a motor body having at a first end a projection that complements the cradle's single slot, and a drive shaft extending from a second end of the motor body and defining a drive axis, the cradle's single slot being substantially perpendicular to the drive axis along an entire length of the slot and terminating at a peripheral edge of a side wall of the second end of the cradle, the side wall being substantially parallel to the drive axis;

the clamping element fixes the motor about the second end of the motor body and the slot of the cradle's second end surface and the projection of the first end of the motor body interconnect to prevent movement of the motor within the cradle along the drive axis.

* * * * *